(No Model.) 3 Sheets—Sheet 2.

S. C. C. CURRIE.
AUTOMATIC CURRENT REGULATOR.

No. 553,901. Patented Feb. 4, 1896.

Witnesses
Geo. Wadman
H. Coutant.

Inventor
Stanley C. C. Currie
By his attorney
E. N. Dickerson

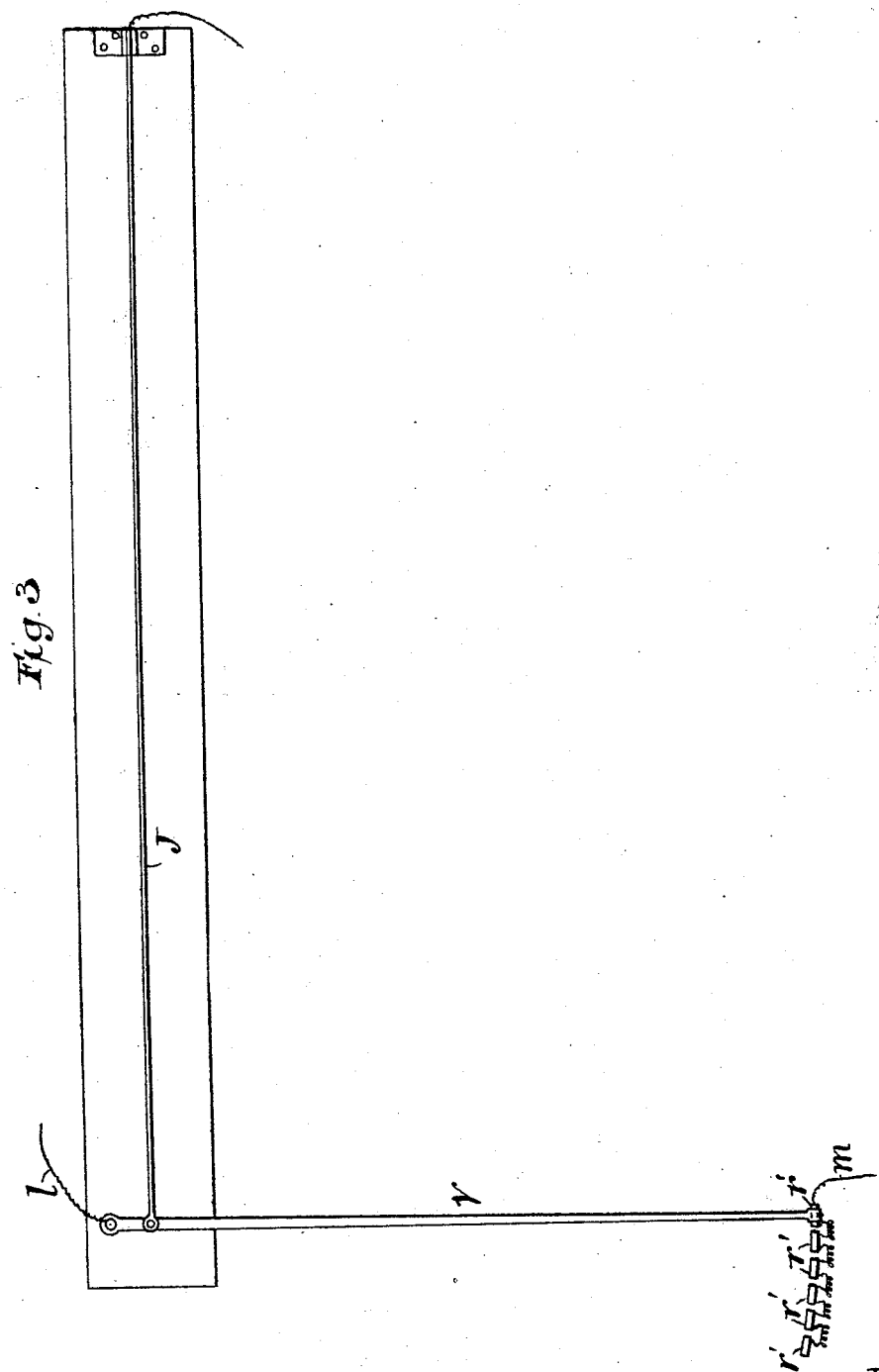

UNITED STATES PATENT OFFICE.

STANLEY C. C. CURRIE, OF NEW YORK, N. Y., ASSIGNOR OF SEVEN-TWENTIETHS TO EDWARD N. DICKERSON, OF SAME PLACE.

AUTOMATIC CURRENT-REGULATOR.

SPECIFICATION forming part of Letters Patent No. 553,901, dated February 4, 1896.

Application filed February 20, 1895. Serial No. 539,068. (No model.)

*To all whom it may concern:*

Be it known that I, STANLEY C. C. CURRIE, of the city, county, and State of New York, have invented a new and useful Improvement in Automatic Current-Regulators, of which the following is a full, true, and exact description, reference being had to the accompanying drawings.

The object of this invention is to afford a simple and reliable method whereby the flow of electric current in a circuit may be regulated and not permitted to exceed a certain quantity. For example, in the case of electric storage-batteries supplying current, if the discharge of current exceeds a certain specified amount, the storage-batteries may be seriously injured. Now, by my method, when the flow of current exceeds a given determined amount, resistance will be automatically thrown into the main circuit, the amount of said resistance being proportionate to the requirements. For example, suppose a circuit with a normal electromotive force of one hundred volts and a maximum allowable current of one hundred ampères, thus making the minimum allowable resistance of main circuit one ohm. Now if by accident or otherwise the resistance shall fall below one ohm, the automatic regulator will cause to be thrown into the circuit a resistance equivalent to such decrease in the main circuit, and thus maintain the total resistance at or near one ohm, and thereby prevent the current exceeding, except by a comparatively small amount, the permissible current of one hundred ampères. This resistance is in the apparatus shown automatically and gradually inserted into the circuit without any sudden steps in the increase.

My process is likewise applicable to preventing the excessive rate of charging of such storage-battery, which is sometimes as disadvantageous as a too great rate of discharge.

My invention will be readily understood from the accompanying drawings, in which—

Figure 1:
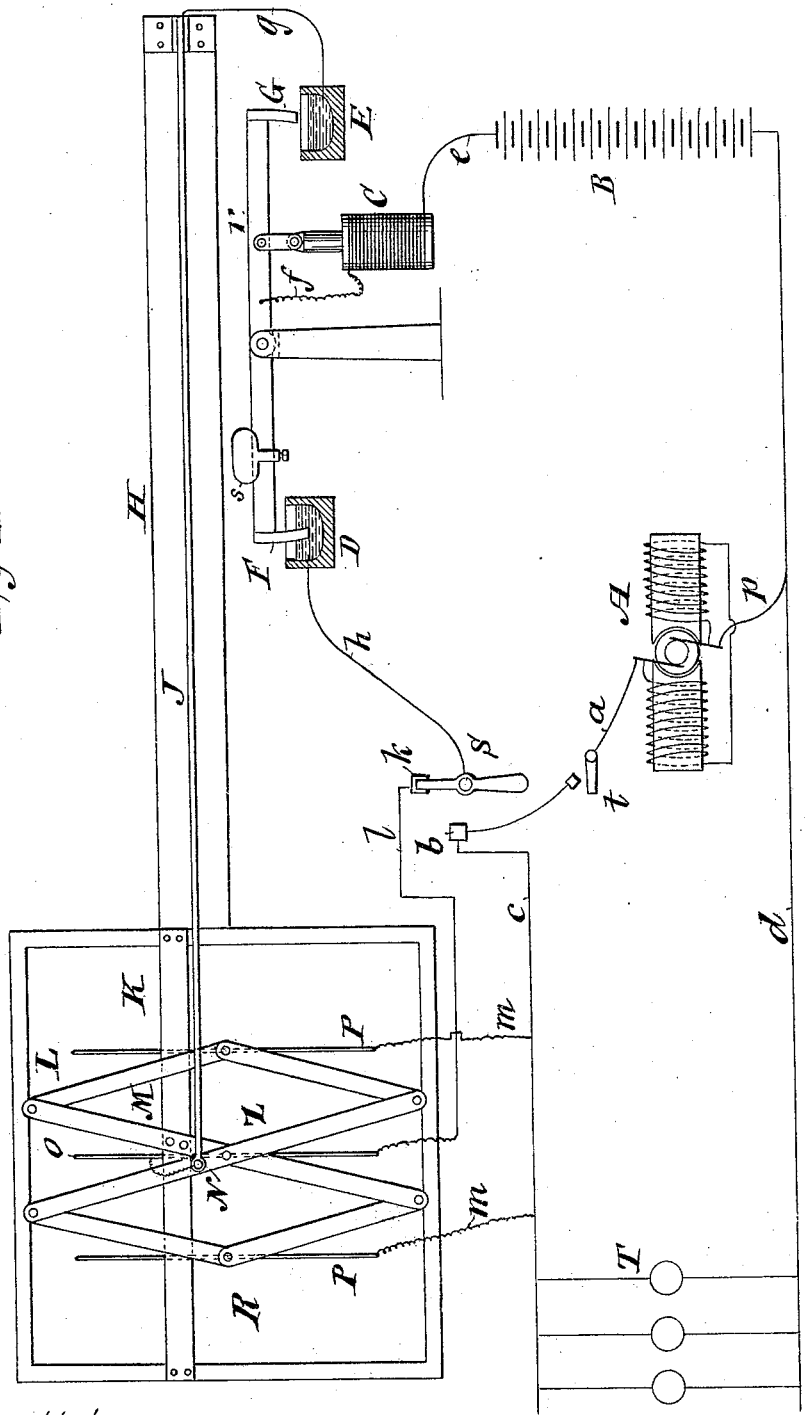
Figure 2:
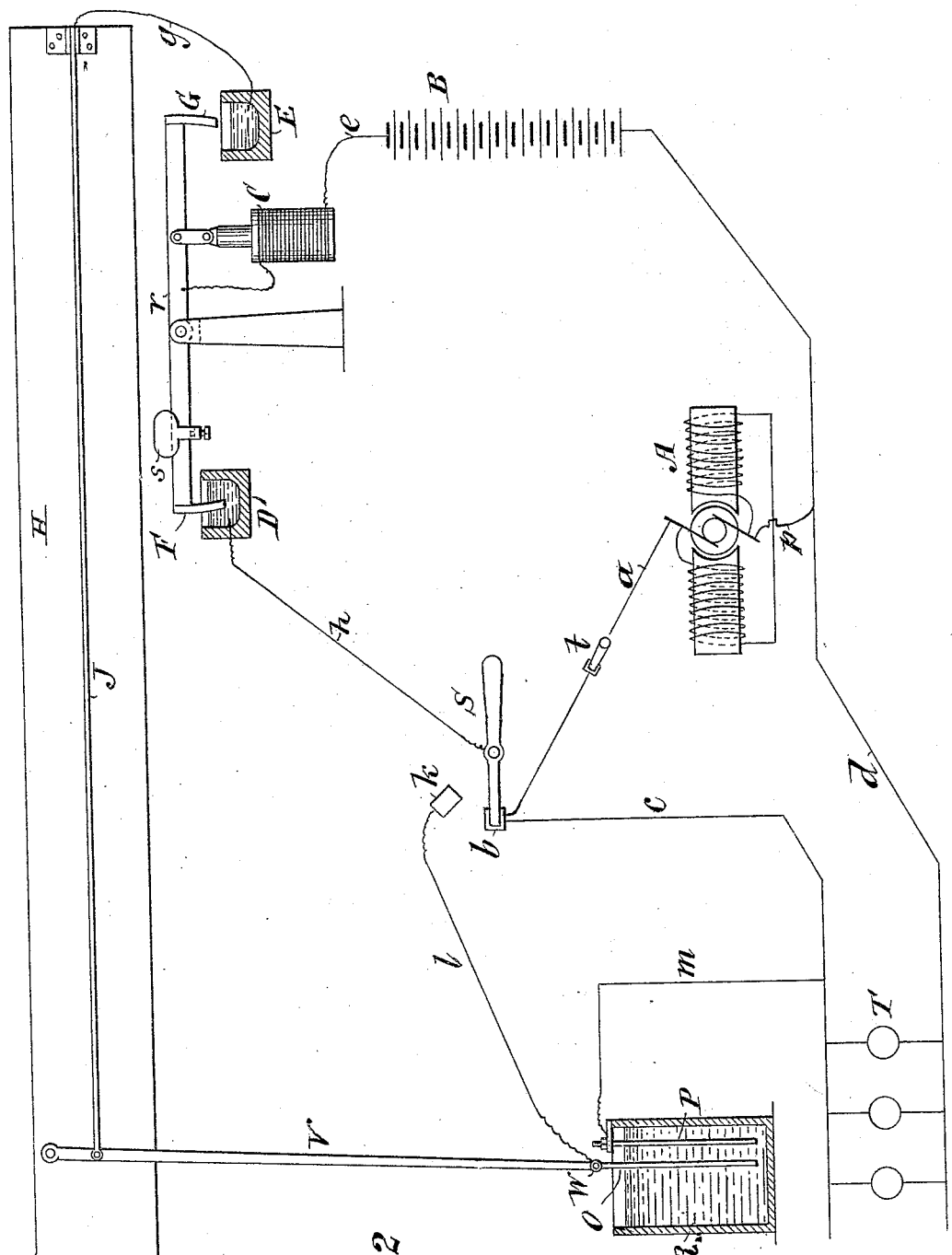

Figure 1 represents diagrammatically an arrangement of my invention; and Fig. 2 substantially the same arrangement, showing, however, a different form of the apparatus for inserting the gradually-variable resistance and showing the switch in the battery-charging position. Fig. 3 represents a view of an automatically-varied rheostat substituted in place of the liquid resistance, Figs. 1 and 2.

In my drawings, A represents the generator connected by wire $p$ to the conductor $d$, which connects to the translating devices T of the working circuit. The other pole of the generator connects by wire $a$ with wire $c$ having contact $b$ of the switch S. When the dynamo is in operation, it is therefore connected directly to the wires $c$ $d$ of the main line. The secondary battery B is connected with the wire $d$ and wire $e$ to solenoid C. This solenoid C has the lever $r$ and adjustable counterbalance-weight $s$, and is arranged to operate two contacts F G in mercury-troughs D E. The current being led to the solenoid C by the wire $e$ passes to the lever $r$, which, in the position shown in Fig. 1, contacts on its left-hand end with mercury-trough D connected with conductor $h$, which connects with the switch S and with contact-point of switch $k$ and with wire $l$ connected to plate O, presently to be described. The other mercury-trough, E, connects by wire $g$ to expansion-rod J, made of a suitable material—for instance, iron—to expand under the influence of the heat of the electric current generated in said rod by its resistance.

In case the current passing through the solenoid C is in excess of that to which the apparatus is adjusted by the position of the counterweight $s$, the current then passes by trough E and wire $g$ to conducting-rod J. One end of this conducting-rod J is attached to the frame H, preferably of the same material as the rod J. The free end thereof is attached on pivot N to a portion of a lazy-tongs. One arm of this lazy-tongs is fixed to the bar K by bolts M, which bar K is attached to the reservoir R.

It will be readily seen that the extension of the rod J will rapidly separate the pivots of the lazy-tongs Z, thereby increasing the distance between the plate O, which is practically fixed in this apparatus, and the plates P P suspended on the external pivots of the lazy-tongs, and which plates are connected by wires m m to circuit c.

In the device shown in Fig. 2 the same general structure is found, excepting that the rod J is attached to the suspension-lever V in such way as to multiply the motion of the rod J on the pivot W, to which the plate O, as before, is suspended. The plates O P P may be of any suitable material, such as copper, and the liquid any suitable liquid, such as sulphate of copper, and I may use a variable rheostat instead of the liquid-reservoir for varying the resistance under some circumstances; but I prefer the liquid-resistance, as being more reliable and more easily actuated.

In the device shown in Fig. 3 a variable resistance $r'$ $r'$ is substituted for the variable liquid-resistance, the operation being otherwise practically the same, the expansion of the rod J affecting the lever V and moving it over the successive contacts $r'$ $r'$, thereby increasing the amount of resistance in the resistance-box, which connects as before with the wires l m.

The operation of my device will now be readily understood. The switch t of the wire a being opened in the apparatus shown in Fig. 1, the battery B is then serving the line. The main circuit passes through C, and provided the current does not exceed the permissible amount it will pass through contact-cup D, wire h, switch S, switch-point k, wire l and plate O to plates P by wires m to wire c, to translating devices T, to wire d, to battery B. If, however, the current should exceed the permissible amount, it will, on small excess of said amount, actuate the solenoid C, and thereby make contact between G and E and break the contact between F and D. The contact between G and E is made before the contact between F and D is broken, thereby preventing sparking. Passing then by wire g and rod J, the excess of current heats the rod J and expands the same, thereby separating the plate O from the plates P P and throwing in an increased resistance in the reservoir R.

It will be obvious that the resistance in the reservoir R is dependent upon the distance between the plates and that this distance is dependent upon the current heating the rod J. Now, as soon as the rod J has expanded to such a degree that the liquid resistance, together with the resistance of the rod, is equal to the decrease of the resistance in the main circuit which has set the apparatus in operation and has decreased to such an extent that the action of the solenoid C is reduced to its normal condition, the contact between E and G will be broken, and the current will again flow through F and D, through wire l, plate O, plates P P, to main line c. In this case, as the rod J cools, the liquid resistance in R will gradually lessen, and if the resistance in the main circuit has not been increased in the meantime the current through the solenoid C will gradually increase until the lever r is again actuated and the rod J reheated, so as to bring up the liquid resistance again to the required amount.

The operation of the device shown in Fig. 2 is substantially the same, the lever V being swung to the left, separating the plates, upon the expansion of the rod J. In this case strict parallelism of the plates O and P can be obtained, which is, in some respects, an advantage. In this figure the dynamo is in operation, and its current passes partly to the line c d and partly passes by the wire h through lever r to the battery B. In case of an excess in the charging-current, as before, the solenoid C is operated, breaking the direct contact through F D and forcing the current to travel through the resistance between plates O and P, which is increased corresponding to the heating of the rod J.

It is obvious that my invention may be carried out in various forms and that the character of the source of electricity is immaterial and that the circuits may be arranged in many ways; also, that the liquid resistance may be of different character—as, for instance, lead plates and dilute sulphuric acid can be employed, or the reservoir R may be used as an accumulator-cell.

The special object of my invention, as will be readily seen, is the prevention of the excessive rate of charge or discharge of a secondary battery by interposing a gradually-varying resistance in the circuit by the action of an expanding or contracting device operated by the heat action of the current passing through it.

What I claim as my invention, and desire to secure by Letters Patent, is—

1. The combination with a circuit embracing a secondary battery, of a resistance device for controlling the amount of current passing through the circuit, and means comprising an expansion-rod for varying the resistance offered to the current, substantially as specified.

2. A variable rheostat, consisting of relatively separable plates, and an expansion apparatus, in combination with means for transferring a movement of expansion or contraction from the expansion apparatus to a plate, substantially as specified.

3. The combination in a variable resistance, of a fixed plate, a relatively movable plate, a reservoir containing liquid, in which the latter plate is movable, an expansion-rod and means operatively connecting said rod with the movable plate to cause a movement of the latter upon the expansion or contraction of the rod, substantially as specified.

4. The combination of the battery B, switch r having contact-points G F, variable-resistance reservoir R, plates O P, and expansion-rod J, said switch r operating the connections for cutting the rod J into circuit or throwing it out of circuit, substantially as described.

5. The combination in a switch for varying electric resistance, of an expanding rod J, operating-lever V, the plate O pivoted to the lever V, and the plate P, both contained in reservoir R, thereby enabling the approach and recession of the plate O and plate P with substantially constant parallelism of motion, substantially as described.

In testimony whereof I have signed my name to this specification in the presence of two subscribing witnesses.

STANLEY C. C. CURRIE.

Witnesses:
 H. COUTANT,
 W. LAIRD GOLDSBOROUGH.